Dec. 5, 1933.   G. WALMSLEY   1,938,552
SYSTEM OF ELECTRIC WELDING
Filed Feb. 26, 1930
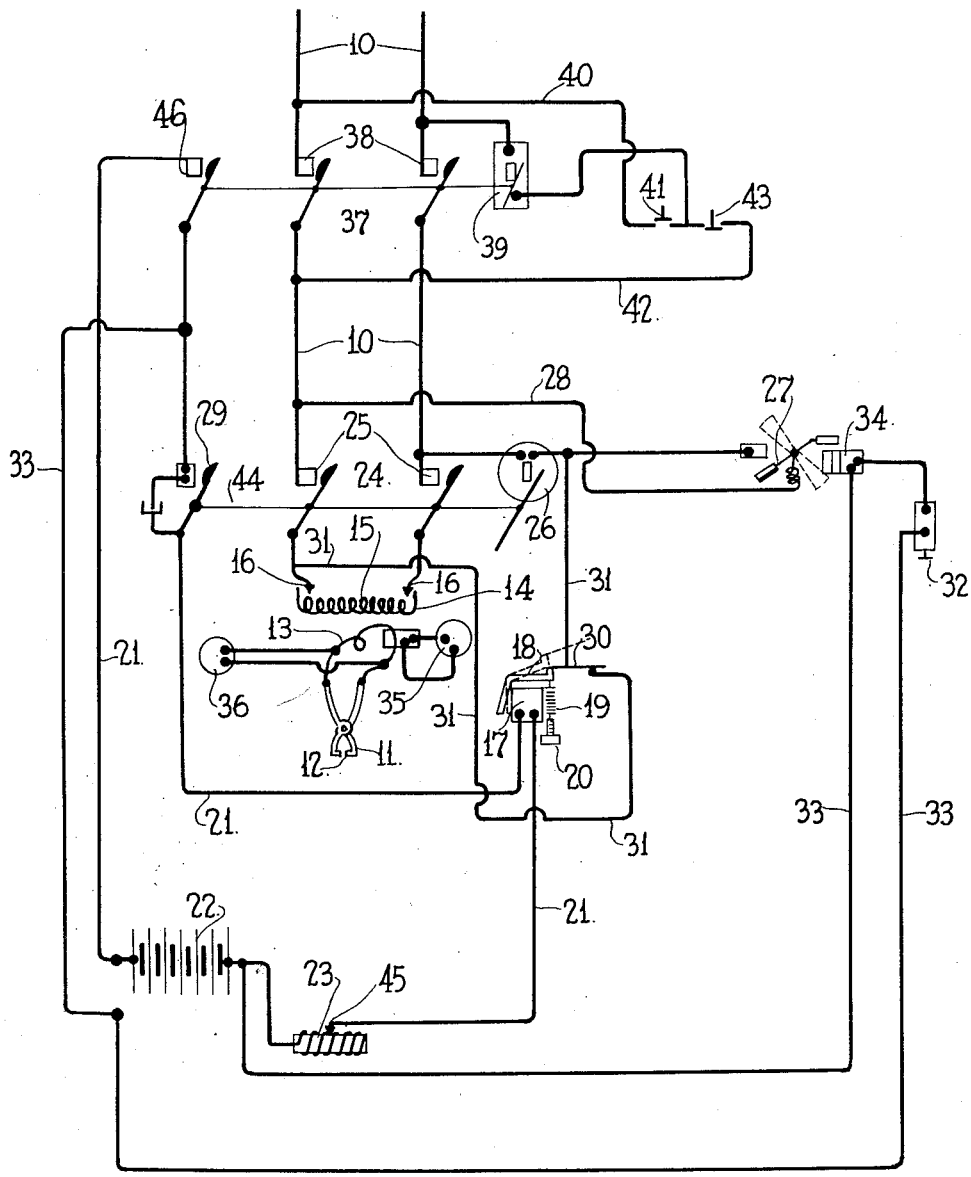
INVENTOR.
GEORGE WALMSLEY
BY *[signature]*
ATTORNEY.

Patented Dec. 5, 1933

1,938,552

UNITED STATES PATENT OFFICE 1,938,552

SYSTEM OF ELECTRIC WELDING

George Walmsley, Philadelphia, Pa., assignor to Edward G. Budd Manufacturing Company, Philadelphia, Pa., a corporation of Pennsylvania Application February 26, 1930. Serial No. 431,420

38 Claims. (Cl. 219—4)

My invention relates to electric welding systems having most especial adaptation to spot welding but in all likelihood having applicability in some phases at least to other fields of electric welding.

Comprehensively stated, it aims to precisely, reliably, efficiently and conveniently adjustably control each and all of the variable electrical factors entering into a spot weld. Particularly does it aim to so control the amount of current application, its voltage, hence the power entering into the weld, and the period of application of such power.

In any formula dependent upon a number of factors for a result, a result of the same order of magnitude may be obtained by wide variations of the various factors involved. Thus, if one factor be of a low order of magnitude, the magnitude of the result may be maintained by increasing the order of magnitude of another factor of the formula. But not always will the quality of the result be the best. In fact, there are always limits within which the magnitude itself can be controlled, and moreover there are always practical limits beyond which the result itself cannot be attained.

This is especially true in electric welding where within a given formula involving mechanical pressure between the surfaces to be welded, the area over which the pressure is exerted and through which current is passed, the shape of the electrodes, electrical resistance of the material and of the electrodes, the presence or absence of foreign matter, the use or non-use of a flux, the amount of current, the height of the voltage, the pressure at which the current application is made, the constancy of current and voltage, and the period of application of current are all consequential factors.

Heretofore relative adjustment of these factors has been as a rule made once for all in a given welding machine to suit a given class of work, and the machine used on that class of work for a long period. Such adjustments were commonly made to suit the resultant weld desired with a given kind of material of a certain gauge or certain difference in gauge to be welded together, and of a certain quality of weld. Always the quality of the resultant weld is the final determinant. Electric spot welding has heretofore been used by far in large part with the larger and rougher products of commerce, such as metal receptacles, automobile bodies, steel railway cars and the like. In such structures there exists every latitude to place so many welds that the strength properties of the weld need only reach an acceptable average. Here also not only are most of the welds internally of the built-up structures for the sake of freeing exposed surfaces of joints and structural detail, but also the entire exposed surfaces of these structures (as well often times as those unexposed) are painted or otherwise given rustproof coatings which conceal the weld and render the appearance quality necessary but an average. In most such structures the factors of safety are so very high as to permit relatively low averages in quality.

With the application of electric welding, particularly spot welding, to aircraft structures however, comes at once a demand for a great increase in the averages of qualities of welds incident fundamentally to factors of safety the limits of which are set by the weight of the craft. Factors of safety are set once for all by a fine balance between absolutely necessary safety and maximum useful load. The strength qualities of welds must reach a very high average. Welds in such structures are moreover, a large percentage of them, on exposed surfaces, permanently exposed for the purpose of permanent inspection of all joints and parts, and latterly in rust-proof materials in which it is not necessary to paint or otherwise coat, and appearance qualities of welds need therefore reach a high average. Still further, welds in such structures are not only made in relatively thin gauge material but between gauges of varying degree and between parts multiple in number, and the strength qualities average must be even better. Yet with all these and other considerations not necessary to mention here but which will be apparent to those skilled in the art, the rapidity, facility and low cost of electric welding operations as practiced in other fields must not be impaired but rather enhanced, for in the aircraft structure the electric spot weld is to be utilized not in hundreds but in thousands in the supplanting of the thousands of rivets heretofore used in those structures.

Specifically, it is one aim of my invention to enable the electric weld, particularly the electric spot weld, to satisfy each and all of these conditions.

My invention is a united method and system, a unique method and system. In the aspect of its method it consists in the passing of electric current between the surfaces to be welded together and simultaneously controlling the current and the period of passage of such current through the weld. Furthermore, the initiation of such passage of current initiates the period of passage. Time period is electrically controlled through the medium of electro-magnetic induction. Adjustment of the time period is achieved jointly through adjustment of the electromagnetic induction and through adjustment of mechanical forces of re-action of the parts actuated through the inductive circuit. Yet further, in the aspect of the method it consists in measuring the electric current, in measuring the electric energy, and in indicating accurately such measurement during the measured period of application. Still further, it consists in manually controlling the institution of the welding operation only but automatically controlling through the electrical factors of the weld formulas themselves the duration of application and the degree of application of the electrical energy of the weld.

Viewed from the aspect of the system or apparatus my invention, in the particular embodiment herein utilized for purposes of explanation, comprises a source of power, welding electrodes, an electro-magnetic circuit breaker controlling the connection and dis-connection of the welding electrodes to the source of power, and a timing device controlling the period of connection of the electrodes with the source of power. Instantaneous indicating devices, an ammeter and a volt meter, are connected with the circuit, and indicate the energies during the timed periods. In the embodiment of my invention disclosed there is provided a locking circuit for the circuit breaker, and an electrical slow relay governing this locking circuit and having its circuit in turn initiated by the closure of the circuit breaker. Its circuit in the diagram shown is a direct current circuit including a variable choke coil. It re-acts against an adjustable spring of variable tension. The initiation of current application is by a manually controlled push button initially closing the electro-magnetic circuit breaker or through some other form of initiating means.

The single figure of the drawing is an electrical circuit diagram symbolically showing the various elements of the system and their interconnecting circuits.

The lines 10 designate the source of power, 11 are the electrodes in the form of pliers the lever elements of which are appropriately insulated from each other in such manner that when the implement is closed to grip the electrodes about the surfaces to be welded together, electric current passes through the engaging points 12 in series. The electrodes 11 are connected in a welding circuit which includes the secondary 13 of a welding transformer 14 the primary of which is designated 15. This primary is provided with variable taps 16 by means of which the number of turns in it may be varied and therefore the voltage of the transformer. A similar arrangement might be provided in connection with the secondary 13.

The electrical slow relay which constitutes an element of the timing means or device is designated 17. It is provided with an armature 18 against which re-acts a spring 19 which may be mechanically adjustable by the thumb screw 20. This relay is in a direct current circuit 21 furnished with direct current by a battery 22. In its circuit is an adjustable choke coil 23.

Connection and dis-connection of the welding electrodes 11 through transformer 14 with the source of power 10 is controlled by an activating means, for example, in the form of an electromagnetic circuit breaker 24 through its main points or contacts 25 connecting directly with the primary 15 of the transformer. Circuit breaker 24 is actuated by an actuator shown in the form of an electromagnet 26 the circuit of which is controlled by the momentary electromagnetic contact switch 27, through circuit 28 from the source of power 10. In addition to its main points 25 it carries a normally open contact 29 closed when main points 25 are closed, to close the circuit 21, of the slow relay 17, constituting the timing device. The relay carries a contact 30 normally closed when the slow relay is de-energized and completing the locking circuit 31 of circuit breaker 24 through one of its main points 25. The circuit of the momentary switch 27 controlling circuit 28 of electromagnet 26 of circuit breaker 24 is in turn controlled from the manually operated push button or other initiating element 32 from the power source shown for purpose of illustration as being of the direct current type 22 over circuit 33 to the coil 34. Ammeter 35 is appropriately connected through a standard shunt or otherwise with the welding circuit 13 and volt meter 36 is connected across the welding electrodes 11. These instruments are such as will instantaneously indicate their readings during the period timed.

In series with the circuit breaker 24 and breaking the mains 10 of the source of power beyond circuit breaker 24 is a second circuit breaker 37 the main contacts 38 of which are in series with the contacts 25. The actuating electro-magnet 39 of this circuit breaker 37 is controlled over a circuit 40 permanently connected with the source of power 10 beyond it and governed by a cut-on push button 41. It is provided with a locking circuit 42 closed through one of the points 38 and governed by a cut-off push button 43.

The method of my invention is fundamentally embodied in the system described. To carry it out, one pushes cut-on button 41, contacts 38 are closed by circuit breaker 37 and its coil 39 locked on through cut-off contact 43 and circuit 42. The work is clamped between the points 12 of the electrodes 11 under the pressure desired as effected through the pliers-like form of these electrodes. Thereby their surfaces to be joined are clamped together under suitable pressure. Manual push button 32 is pressed. Instantly circuit 33 is closed through energizing coil 34 of the momentary switch 27. This closes actuating circuit 28 from the source of power 10 to the coil 26 of circuit breaker 24. This circuit breaker energized closes its points 25 and applies power to the transformer 14 and through it current to the electrodes 11 is passed between the clamped surfaces to be welded at the points 12. The initiation of such passage of current between the surfaces to be welded as effected by the closure of points 25 also closes point 29 actuated by the same circuit breaker 24, for points 25 and 29 are interconnected by the means diagrammed as 44. Point 29 closes direct current circuit 21 from battery 22 through the electrical slow relay 17 of a timing means. The electro-magnetic self-induction of this relay 17 plus the electro-magnetic induction of the coil 23 delays its pull upon its armature 18 for a determinate period depending upon the adjustment of the choke coil 23 and its own adjustment. This period is an exact and precise period for each such adjustment with constancy of the battery 22. At the moment that device 17 builds up sufficient force to attract its armature 18 against the pressure of the re-acting spring 19, it opens the normally closed contact 30 of locking circuit 31 of circuit breaker 24, de-energizing coil 26 and opening not only its main points 25, instantly cutting off the applica'ion of current to electrodes 11 but also opening the circuit of the timing means itself at points 29. During the timing period of welding current application as measured, ammeter 35 and volt meter 36 give the instantaneous indication for which they are arranged, an indication not only of current and of voltage but of energy entering into the weld.

By means of the adjustable taps 16 the voltage and hence the current and the energy entering into the weld may be freely adjustable between any weld and the next succeeding, adjusted with the greatest facility. By means of the adjustable choke coil 23 or equivalent means in the circuit of device 17 or in the device itself, the time period of this device to break the locking circuit 31 and define accurately the period of application of welding circuit to the electrodes 11, may be freely adjusted. Aiding in this adjustment is the adjustment 20 of the re-acting spring 19 connected with the armature 18 controlling contact 30. The greater reactive force provided the greater the electro-magnetic force required to overcome it and hence the greater the time required for the electro-magnetic induction of circuit 21 as a whole to permit the current in that circuit to build up to the higher value required to overcome the higher re-active force. As aforesaid, this may be adjusted with extreme accuracy too. Actually in values reckoned in thousandths of seconds or hundredths of thousandths of seconds, adjustments can be made merely by the slight movement of the handle as 45 on the choke coil 23 or the fractional turn of thumb screw 20. It is obvious that definite time periods, much longer in duration, for example, tenths or twentieths of seconds, are even more readily adjustable. Thereby adjustment between one weld and the next succeeding is without consequential time lost. With adjustment of work clamping pressure as effected manually or otherwise through the pliers-like embodiment of the electrodes 11, with adjustment of the welding transformer tap 16 as readily achieved through well known angularly adjustable switch arms, and with such supremely easy adjustment of the timing period of the passage of current as effected by devices 45 and 20. adjustments of these factors of the welding formula to attain quality irrespective of variations in the work to be done become a matter attended with the very greatest celerity. Immediately conditions of the work require it on any account, a system may be caused to meet the demand.

Irrespective of the shortness of the period of passage of current between the surfaces of the work as pre-determined by the timing device, and irrespective of the length of time that manual push button 32 is held depressed, but the one weld, the factors of which are precisely as adjusted, can result. For so long as push button 32 is held down momentarily, contact 27 is held in its dotted line position having made and then broken circuit 28. A one way switch closing in one direction only is well known in the art whereby it does not close circuit 28 on de-energization of coil 34. When, push button 32 having been released, contact 27 has returned to its normal full line position it may again be caused to energize coil 26 of circuit breaker 24 and again effect the weld by again pushing button 32. An intermittent mechanical operation may be substituted for the manual operation of push button 32 to effect continuous automatic operation.

Upon the completion of welding operations according to my method as carried out by the system, push button 43 may be pressed, opening circuit 42 of circuit breaker 37, cutting out the entire automatic portion of the system from circuit breaker 24 on, thereby not only is the system cut completely on or off preventing unintended application of the method of my invention, but thereby also may the entire automatic part of the system be cut out in case of impairment of any part of it, cut out independently entirely of the circuit breaker 24, which constitutes a portion of the automatic branch of the system.

The circuit 33 it will be noted is completed when the outermost circuit breaker 37 is closed at contacts 43. Likewise the circuit 21 is controlled by contacts 29 and 46 in series.

That my invention has many modifications is certain. Interpretation of the annexed claims should be in view of its generic spirit as evinced by comparison of the prior art and not as evinced by the circumstantial terminology of the specification and claims themselves.

What I desire to claim as new and useful and secure by Letters Patent is:—

1. An electric welding system comprising welding electrodes, an electro-magnetic circuit breaker controlling the connection and dis-connection of the electrodes to a source of power, a self-locking circuit for said circuit breaker locking the same on, and an electrical slow relay controlling the time of closure for said locking circuit.

2. An electric welding system comprising welding electrodes, an electro-magnetic circuit breaker controlling the connection and dis-connection of the electrodes to a source of power, a self-locking circuit for said circuit breaker locking the same on, and an electrical slow relay means controlling the period of closure of said locking circuit, together with a direct current means effecting the control of said relay.

3. An electric welding system comprising an alternating current circuit, welding electrodes, an electro-magnetic circuit breaker for connecting and dis-connecting said electrodes and said alternating current circuit, a locking means having a circuit for said circuit breaker, and electrical means having a slow relay type of operation controlling the time period of closure of said locking circuit, and a circuit for said relay cut on by said circuit breaker.

4. An electric welding system comprising a source of power, welding electrodes, an electro-magnetic circuit breaker cutting said electrodes on to and off said source of power, and a direct current circuit including a variable choke coil, said choke coil being between said direct current source and said circuit breaker to variably control the time of application of welding current.

5. An electric welding system comprising, welding electrodes and a pair of double pole electro-magnetic circuit breakers in series each controlling the application of current from both sides of the source to said electrodes, automatic means connected with the actuating coil of the circuit breaker nearest the electrodes to control the time period of current application thereby, and manual control means connected with the actuating coil of the circuit breaker remote from the electrodes for controlling current application by it.

6. An electric welding system comprising a welding circuit, circuit breakers in tandem controlling the application of welding energy to said welding circuit, electro-magnetic means controlling the innermost of said circuit breakers, and a control circuit for said electro-magnetic means controlled from the outermost of said circuit breakers.

7. An electric welding system comprising an electrical timing device determining the duration of the weld, a source of power, a welding circuit, the time of closure of which is controlled by said timing device, double pole circuit breakers in tandem each controlling the connection of the circuit to both sides of a source of power, the innermost one of which circuit breakers is controlled by said timing device, and a circuit for the timing device controlled jointly by the innermost and outermost circuit breakers.

8. An electric spot welding system comprising welding electrodes, a timing device controlling the period of application of welding current to the electrodes, a control circuit, and control means operated by said circuit having a cycle of operation independent of said timing device for effecting the application of current to the welding electrodes for but one period for each cycle of its control operation.

9. An electric spot welding system comprising welding electrodes, a timing device controlling the period of application of welding current to the electrodes in an automatic repetitive cycle, a control circuit and control means in said circuit inherently limited in its control of the timing device to application of welding current to the electrodes for but one timed period for each cycle of its control operation.

10. An electric spot welding system comprising welding electrodes, a timing device controlling the period of application of welding current to the electrodes in an automatic repetitive cycle, a control circuit, and electromagnetically operated control means whose operation is effected by said circuit inherently limited in its control of the timing device to application of welding current to the electrodes for but one timed period for each cycle of its control operation.

11. An electric spot welding system comprising welding electrodes, a timing device controlling the period of application of welding current to the electrodes, a control circuit and control means whose operation is effected by said circuit comprising means having a one-way circuit closing action independent of said timing device to limit the application of current to the welding electrodes to but one period for each cycle of its control operation.

12. In combination, welding electrodes, a source of alternating current electric power for the supply of welding current to said electrodes, a timing device controlling the period of application of welding currents from said source to said electrodes, and direct current means governing said timing device.

13. In combination, welding electrodes, a source of alternating current power for supplying welding current to said electrodes, a switching device controlling the supply of welding current to the electrodes from the source, a source of direct current from which said switching device is operated, and a variable inductance between said direct current source and said switching device to variably control the time of application of welding current.

14. In combination, welding electrodes, means for supplying welding current to said electrodes, an electromagnetic circuit breaker controlling the application of said welding current, means to energize the circuit breaker, means to de-energize the circuit breaker and direct current timing means whose initiation is effected by the circuit breaker and which effects the governing of said de-energizing means.

15. In combination, welding electrodes, a circuit breaker controlling the application of power to the electrodes, a manual control circuit and a self-locking circuit for said breaker in parallel, and a timing device effecting the control of the locking circuit and adapted to break the circuit after the lapse of a predetermined time.

16. In combination, welding electrodes, a circuit breaker controlling the application of power to the electrodes, a manual control circuit and a self-locking circuit for said breaker in parallel, and a timing device in the locking circuit adapted to break the circuit after the lapse of a predetermined time, together with means having a one way circuit closing action in said manually controlled circuit for controlling said circuit breaker.

17. A resistance welding system comprising a welding circuit and an energizing circuit, means activating said energizing circuit, electrical means predetermining the period of activation through control of the activating means, push button means initiating said system operation, and electrical means preventing consecutive activation of said circuit due to a condition of continued operation of said initiating means.

18. An electric resistance welding system comprising a welding circuit, an energizing circuit therefor, means for activating said energizing circuit, a locking means for said activating means including an electric circuit, means determining the period of energization of said locking circuit, a timing circuit for said last-named means, and means initiating said timing circuit upon actuation of said activating means to determine the closure period of said locking circuit.

19. An electric resistance welding system comprising a welding circuit, an energizing circuit therefor, means for activating said energizing circuit, a locking means including an electric circuit for said activating means, means determining the period of energization of said locking circuit, a timing circuit for said last-named means, means initiating said timing circuit upon actuation of said activating means to determine the closure period of said locking circuit, and control means actuating said activating means and limiting actuation of said activating means to one pre-determined period irrespective of continued operation of said control means.

20. An electric welding system comprising welding electrodes, a circuit breaker controlling the connection and dis-connection of the electrodes to a source of power, a self-locking circuit for said circuit breaker locking said circuit breaker on through one of the contacts of said circuit, and electrical slow relay means controlling the time period of closure for said locking circuit.

21. An electric welding system comprising welding electrodes, an electro-magnetic circuit breaker controlling the connection and dis-connection of the electrodes to a source of power, a self-locking circuit for said circuit breaker locking the same on through one of the contacts of said circuit breaker, and electrical slow relay means controlling the time of closure for said locking circuit.

22. An electric welding system comprising an electrical timing device determining the duration of the weld, a welding circuit, the time of closure of which is controlled by said timing device, a plurality of relatively movable contact devices in tandem controlling the connection of the circuit to a source of power, the one of said contact devices controlled by said timing device, and a circuit of the timing device the control of which is effected jointly by a plurality of said contact devices.

23. An electric resistance welding system comprising a welding circuit, an energizing circuit therefor, means for activating said energizing circuit, an activating circuit for said activating means, means determining the period of energization of said activating circuit, a normally open timing circuit for said last-named means, and means closing said timing circuit conjointly with actuation of said activating means to determine the closure period of said activating circuit.

24. An electric resistance welding system comprising a welding circuit, an energizing circuit therefor, means for activating said energizing circuit, an activating circuit for said activating means, means determining the period of energization of said activating circuit, a timing circuit for said last-named means, means initiating said timing circuit conjointly with actuation of said activating means to determine the closure period of said activating circuit, and control means initiating said system operation actuating said activating means and limited in its actuation of said activating means to one pre-determined period irrespective of continued operation of said control means.

25. An electric welding system comprising an energizing circuit, welding electrodes, an electromagnetic circuit breaker cutting said electrodes into and out of connection with said circuit, means for actuating said circuit breaker, and a timing circuit including an adjustable choke coil, said choke coil being arranged with respect to said circuit breaker actuating means to variably control the time of application of welding current in said system.

26. An automatic resistance welding system comprising an activating means adapted to effect the cut-on and cut-off of energy to a primary circuit of a welding transformer to activate the welding circuit, a time controlled actuator including a timing circuit for said activating means energized independently of welding electrode movement and having a determinate time cycle of actuating operation which upon its initiation is self-determining independently of all other means, and an electric push button circuit for initiating the action of said actuator whose period of initiating effectiveness for each single actuator cycle initiated is limited to a time shorter than the timing cycle of said actuator.

27. An automatic resistance welding system comprising an activating means adapted to effect the cut-on and cut-off of energy to a primary circuit of a welding transformer to activate the welding circuit, a time controlled electrical actuator for said activating means having a determinate time cycle of actuating operation, electrical push button means for initiating the action of said actuator, said time controlled actuator operating upon a power generated independently of the initiating means actuation, and including means effective upon the initiation of a time cycle to annul the effectiveness of the initiating action of said initiating means until the time cycle initiated is terminated and the initiating means again operated.

28. An automatic resistance welding system comprising an activating means adapted to effect the cut-on and cut-off of energy to a primary circuit of a welding transformer to activate the welding circuit, a time controlled actuator for said activating means energized independently of welding electrode movement and having a determinate time cycle of actuating operation, which actuator contains an electrically operated lock-in device rendered effective through actuation of said actuator and rendered ineffective through the completion of the cycle of said time controlled actuator itself, and electrical push button means for initiating the action of said actuator.

29. An automatic resistance welding system comprising an activating means adapted to effect the cut-on and cut-off of energy to a primary circuit of a welding transformer to activate the welding circuit, a time controlled electro-magnetically controlled actuator for said activating means including a timing circuit having a determinate time cycle of activating operation, which upon its initiation is self-determining independently of all other means, and means including a push button circuit for initiating the action of said actuator, said time controlled actuator operating upon a power generated independently of the initiating means actuation.

30. The combination with an electric resistance welding device including a primary circuit, of a normally open energizing circuit, a switch for operatively connecting said circuits, an actuator for said switch, electrical means for maintaining said circuits operatively energized through said switch including a locking-on circuit for said switch, means including a push button controlled circuit for initiating the operation of said actuator, and means including a circuit closed by said switch and arranged to de-energize said locking circuit after a predetermined time period whereby to terminate the passage of welding current in said device after the expiration of a definite time period of passage of said effective welding current.

31. The combination with an electric resistance welding apparatus of a normally open circuit connecting said apparatus to a source of potential, a circuit breaker having a plurality of relatively movable contacts arranged to close said circuit and maintain said circuit closed and to effect the operation of a locking circuit operating through certain of said contacts, and means to render said circuit ineffective after a definite period of time including slow relay means whose energization is effected by the closure of a timing circuit through certain of said contacts, means including a push button circuit to initiate the operation of said apparatus, and electrical means to prevent more than a single actuation of said welding circuit for one operation of said initiating means.

32. Electric resistance welding apparatus comprising a pair of electrodes arranged to be brought into contact with work, an electric circuit for supplying the electrodes with energy, and means for operatively energizing said circuit with current fluctuating to and from zero and for maintaining said circuit energized for a definite length of time, and for effectively de-energizing said circuit, said means including a circuit breaker in said circuit, a locking circuit whose closure is effected through the closure of said circuit breaker contacts, and a timing circuit effecting the opening of said circuit breaker after a definite period of time and whose energization is effected through the operation of said circuit breaker.

33. Electric resistance welding apparatus comprising a pair of electrodes arranged to be brought into contact with work, an alternating current electric circuit for supplying the electrodes with energy, means including a circuit breaker for operatively energizing said circuit and including a locking circuit and a timing circuit for maintaining said circuit energized for a predetermined length of time, and for effectively de-energizing said circuit, initiating means including a push button circuit for initiating the operation of said means, and relay means having a one-way action whereby only one effective energization of said circuit can result from one actuation of said initiating means, regardless of how long said actuation may continue.

34. An electric welding system comprising a welding circuit, and electrodes adapted to be brought into contact with the work, a plurality of relatively movable contacts arranged to effect the energization of said welding circuit, push button means to initiate said system operation, actuator means arranged to effect the engagement of said contacts upon operation of said push button means and to allow only one welding operation for each operation of said push button means to prevent foreshortening of said timed period, and timing means to determine the period of closure of said contacts.

35. An electric spot welding system comprising welding electrodes, a timing device controlling the period of application of welding current to the electrodes, a push button means including electric circuits arranged to control said system, control means whose operation is effected by said circuit having a cycle of operation independent of said timing device for effecting the application of current to the welding electrodes for but one period for each cycle of its control operation.

36. An electric welding system comprising welding electrodes, and an electro-magnetic circuit breaker controlling the effective connection and dis-connection of the electrodes to a source of power, electrical push button means to initiate said system operation, means locking said circuit breaker on for a pre-determined time period, and an electrical slow relay means controlling the time of effectiveness of said locking-on means and means arranged to prevent a foreshortening of the time period initiated.

37. An electric welding system comprising a welding circuit and electrodes adapted to be brought into contact with the work, a plurality of relatively movable contact devices in series and arranged to effect the energization and de-energization of said welding circuit, electro-magnetic means effecting the closure of said contact devices, electrical push button means to initiate the operation of said system, means effective to limit said system operation to one operative energization for each operation of said push button means, electrical means timing the period of energization of said welding circuit, and means insuring the energization of said welding circuit for the entire pre-set timed period and arranged to prevent a foreshortening of said time period.

38. An automatic resistance welding system comprising an activating means adapted to effect the cut-on and cut-off of energy to a primary circuit of a welding transformer to activate the welding circuit, a time controlled electrical actuator for said activating means having a determinate time cycle of actuating operation, electrical push button means for initiating the action of said actuator, said time controlled actuator operating upon a power generated independently of the initiating means actuation, means effective upon the initiation of a time cycle to annul the effectiveness of the initiating action of said initiating means until the time cycle initiated is terminated and the initiating means again operated, and an emergency control circuit which may be operated to render the system temporarily inoperable upon the occurrence of abnormal conditions of welding.

GEORGE WALMSLEY.